United States Patent
Dong et al.

(10) Patent No.: US 11,825,365 B2
(45) Date of Patent: Nov. 21, 2023

(54) METHOD AND DEVICE FOR REQUESTING SYSTEM INFORMATION, STORAGE MEDIUM, AND TERMINAL

(71) Applicant: ZTE CORPORATION, Shenzhen (CN)

(72) Inventors: Fei Dong, Shenzhen (CN); Kalyan Eswar Vutukuri, Shenzhen (CN); He Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 10 days.

(21) Appl. No.: 17/254,190

(22) PCT Filed: May 6, 2019

(86) PCT No.: PCT/CN2019/085730
§ 371 (c)(1),
(2) Date: Dec. 18, 2020

(87) PCT Pub. No.: WO2019/242417
PCT Pub. Date: Dec. 26, 2019

(65) Prior Publication Data
US 2021/0136643 A1    May 6, 2021

(30) Foreign Application Priority Data
Jun. 21, 2018    (CN) .......................... 201810645375.1

(51) Int. Cl.
*H04W 36/08*    (2009.01)
*H04W 76/27*    (2018.01)
(Continued)

(52) U.S. Cl.
CPC ........... *H04W 36/08* (2013.01); *H04W 24/08* (2013.01); *H04W 36/0058* (2018.08);
(Continued)

(58) Field of Classification Search
CPC . H04W 74/0833; H04W 48/14; H04W 36/08; H04W 48/08; H04W 48/20;
(Continued)

(56) References Cited

U.S. PATENT DOCUMENTS

2018/0279378 A1\* 9/2018 Tsai .................. H04W 56/0005
2018/0317264 A1\* 11/2018 Agiwal ............... H04W 74/085
(Continued)

FOREIGN PATENT DOCUMENTS

CN    102119501 A    7/2011
CN    102695217 A    9/2012
(Continued)

OTHER PUBLICATIONS

Chinese Office Action for Application No. 201810645375.1, dated Aug. 26, 2021, 15 pages including translation.
(Continued)

*Primary Examiner* — Nam T Huynh
(74) *Attorney, Agent, or Firm* — Morgan, Lewis & Bockius LLP (57) ABSTRACT

Provided are a method and device for requesting system information, a storage medium and a terminal. The method includes that: a terminal performs a cell reselection in the case where the terminal initiates a system information request procedure but has not successfully completed the system information request procedure, the terminal resets an MAC layer or a relevant parameter of an RACH procedure, and the terminal acquires required SI according to an RRC configuration of a reselected cell. When the terminal initiates the system information request procedure, the terminal may immediately reset the MAC layer or the relevant parameter of the RACH procedure after triggering the cell reselection,
(Continued)

so as to terminate the current system information request procedure, and acquire the required SI again in the reselected cell.

18 Claims, 4 Drawing Sheets

(51) Int. Cl.
  *H04W 36/00* (2009.01)
  *H04W 24/08* (2009.01)
  *H04W 74/08* (2009.01)
  *H04W 80/02* (2009.01)
  *H04W 48/16* (2009.01)

(52) U.S. Cl.
  CPC ....... *H04W 48/16* (2013.01); *H04W 74/0833* (2013.01); *H04W 76/27* (2018.02); *H04W 80/02* (2013.01)

(58) Field of Classification Search
  CPC ... H04W 48/16; H04W 48/10; H04W 74/002; H04W 36/24; H04W 36/30; H04W 76/27
  See application file for complete search history.

(56) References Cited

U.S. PATENT DOCUMENTS

| | | | | |
|---|---|---|---|---|
| 2019/0327665 A1* | 10/2019 | Geng | .................... | H04W 72/30 |
| 2020/0154513 A1* | 5/2020 | Zhang | .................... | H04W 80/02 |
| 2020/0178141 A1* | 6/2020 | Lee | ....................... | H04W 48/16 |
| 2021/0258986 A1* | 8/2021 | Chang | ................ | H04W 74/006 |

FOREIGN PATENT DOCUMENTS

| | | |
|---|---|---|
| CN | 106656442 A | 5/2017 |
| CN | 107624255 A | 1/2018 |
| CN | 107889190 A | 4/2018 |
| CN | 108023711 A | 5/2018 |
| CN | 108023712 A | 5/2018 |
| CN | 109392049 A | 2/2019 |

OTHER PUBLICATIONS

International Search Report for Application No. PCT/CN2019/085730, dated Jul. 16, 2019, 4 pages.

ITRI, "Including Cell Reselection Information in the Minimum SI", *3GPP TSG-RAN WG2 Meeting #95bis, R2-166484*, Sep. 30, 2016 (Sep. 30, 2016), main body, pp. 1-4.

"3rd Generation Partnership Project; Technical Specification Group Radio Access Network; NR; NR and NG-RAN Overall Description; Stage 2 (Release 15)" 3GPP Standard, Technical Specification, 3GPP TS 38.300, 3rd Generation Partnership Project (3GPP), Mobile Competence Centre, 650, Route Des Lucioles, F-06921 Sophia-Antipolis Cedex, France, vol. RAN WG2, No. V.15.2.0, Jun. 20, 2018 (Jun. 20, 2018), pp. 1-87, XP051472915, [retrieved on Jun. 20, 2018].

"3rd Generation Partnership Project; Technical Specification Group Radio Access Network; NR; Radio Resource Control (RRC) protocol specification (Release 15)", 3GPP Standard, Technical Specification, 3GPP Ts 38.331, 3rd Generation Partnership Project (3GPP), Mobile Competence Centre, 650 Route Des Lucioles, F-06921 Sophia-Antipolis Cedex, France, vol. RAN WG2, No. V15.2.0, Jun. 20, 2018 (Jun. 20, 2018), pp. 1-304, XP051472922, [retrieved on Jun. 20, 2018].

Asustek, "UE actions upon cell reselection in RRC_Inactive", 3GPP Draft, R2-1800043, 3rd Generation Partnership Project (3GPP), Mobile Competence Centre, 650, Route Des Lucioles, F-06921 Sophia-Antiplois Cedex, France, vol. RAN WG2, No. Vancouver, Canada, Jan. 22, 2018-Jan. 26. 2-19 Jan. 12, 2018 (Jan. 12, 2018), XP051385968, Retrieved from the Internet: URL:http://www.3gpp.org/ftp/tsg%5Fran/WG2%5FRL2/TSGR2%5FAHs/2018%5F01%5FNR/Docs/ [retrieved on Jan. 12, 2018].

Chinese Office Action for Application No. 201810645375.1, dated Mar. 4, 2022, 12 pages including translation.

Extended European Search Report for Application No. 19821740.8, dated Mar. 1, 2022, 15 pages.

* cited by examiner

METHOD AND DEVICE FOR REQUESTING SYSTEM INFORMATION, STORAGE MEDIUM, AND TERMINAL

CROSS-REFERENCE TO RELATED APPLICATIONS

This is a National Stage Application filed under 35 U.S.C. 371 based on International Patent Application No. PCT/CN2019/085730, filed on May 6, 2019, which claims priority to Chinese Patent Application No. 201810645375.1 filed on Jun. 21, 2018, the disclosures of both of which are incorporated herein by reference in their entireties.

TECHNICAL FIELD

The present disclosure relates to the field of mobile communications and, in particular, to a method and device for requesting system information, a storage medium and a terminal.

BACKGROUND

In a long term evolution (LTE) system, all terminals camped in a cell are periodically notified of all system information (SI) in a broadcasting mode. Different system information may be broadcast with different periods. A terminal merely needs to wait for receiving the required SI in configured corresponding SI windows and on resource blocks (RBs).

Figure 1:
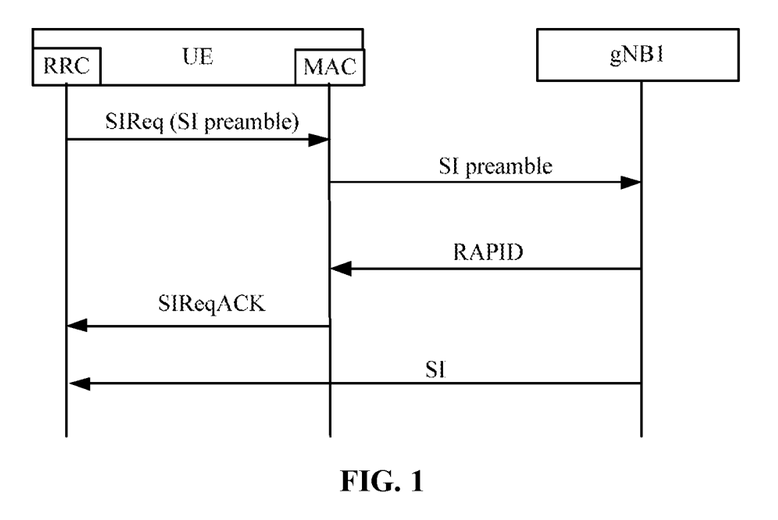
FIG. 1 is a schematic diagram of an Msg.1 based SI request procedure according to the related art.
Figure 2:
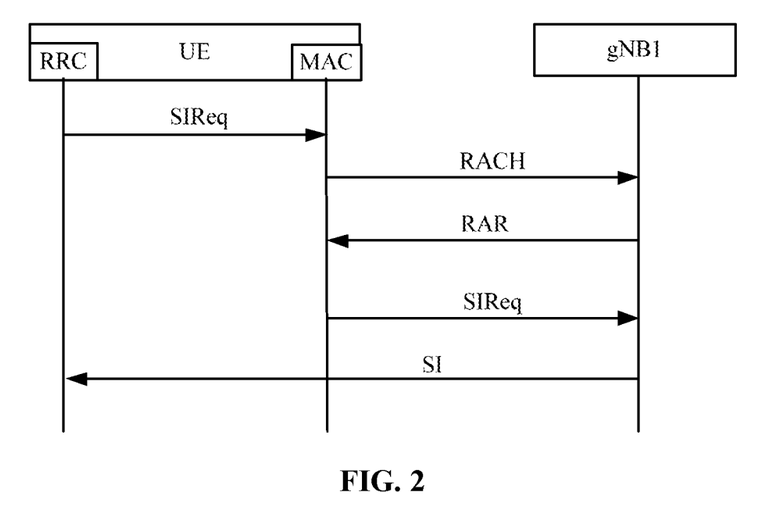
FIG. 2 is a schematic diagram of an Msg.3 based SI request procedure according to the related art.

Compared with the LTE system, in a new ratio (NR) system (a system corresponding to a 5G network), system information has been greatly increased. If the broadcasting mode of the LTE system is still used, the resources overheads of public broadcast channels and the power consumption of a base station will be inevitably increased. However, some system information is in little demand. In view of such features, an SI request procedure is introduced in the existing NR system, in which some infrequent system information is no longer periodically broadcast, but is requested by the terminal actively, and a base station side (gNB) issues the requested SI when receiving the request. The SI request procedures may be divided into an Msg.1 based SI request procedure and an Msg.3 based SI request procedure, as shown in FIGS. 1 and 2.

The difference between the two SI request procedures is that: for the Msg.1 based SI request procedure, a network side matches a preamble (a preamble sequence, i.e. Msg.1) with one or more pieces of system information to inform a terminal side through radio resource control (RRC) signaling. When requiring one or more pieces of SI, the terminal side directly sends a corresponding preamble (Msg.1) to inform the base station. After the base station receives the preamble, the base station takes a random access response (RAR) carrying a corresponding random access preamble identity (RAPID) as an acknowledgment (ACK) for the received preamble. The terminal receives and correctly decodes the RAR to obtain the RAPID, and if the RAPID conforms to the sent preamble ID, the terminal considers that the SI request procedure is successful, and then receives the requested one or more pieces of SI in a corresponding SI window and on a corresponding RB. For the Msg.3 based SI request procedure, the network side does not match a preamble with SI. If a terminal requires such SI, the terminal firstly selects a preamble from a preamble set for contention-based random access (CBRA) to initiate a random access channel (RACH) procedure, and carries the information of the required SI in Msg.3. The base station receives the Msg.3, and notifies the terminal by using a contention resolution media access control (MAC) protocol data unit (PDU) as an ACK. The terminal receives and correctly decodes the contention resolution MAC PDU, confirms that the contention is successful, and then, the terminal receives corresponding SI at corresponding positions.

In view of the above analysis, it can be seen that: after the SI request procedure is introduced, the terminal may perform measurements while performing the SI request procedure when the terminal is in an RRC_IDLE or RRC_Inactive state. When finding that a measured result conforms to the cell reselection, the terminal may perform a cell handover and switch to a target cell. However, the terminal is still performing the SI request procedure on an original cell at this time, so that the energy overheads of a base station of the original cell are wasted.

SUMMARY

The present disclosure provides a method and device for requesting system information, a storage medium and a terminal, to solve that: a terminal performs a cell reselection in an SI request procedure, but since the terminal still performs the SI request procedure on an original cell at this time, the energy overheads of a base station of the original cell are wasted.

In one aspect, the present disclosure provides a method for requesting system information. The method includes that: a terminal performs a cell reselection in the case where the terminal initiates a system information request procedure but has not successfully completed the system information request procedure, the terminal resets an MAC layer or a relevant parameter of an RACH procedure, and the terminal acquires required SI according to an RRC configuration of a reselected cell.

In another aspect, the present disclosure further provides a device for requesting system information. The device includes a reselection module, a reset module and a processing module. The reselection module is configured to perform a cell reselection of a terminal in the case where the terminal initiates a system information request procedure but has not successfully completed the system information request procedure. The reset module is configured to reset an MAC layer or a relevant parameter of an RACH procedure. The processing module is configured to acquire required SI according to an RRC configuration of a reselected cell.

In another aspect, the present disclosure further provides a storage medium. The storage medium stores a computer program. The computer program is configured to, when executed by a processor, implement the steps of the method for requesting system information described above.

In another aspect, the present disclosure further provides a terminal. The terminal includes at least a memory and a processor. The memory stores a computer program. The processor is configured to, when executing the computer program in the memory, implement the steps of the method for requesting system information described above.

In the present disclosure, when the terminal initiates the system information request procedure, the terminal may immediately reset the MAC layer or the relevant parameter of the RACH procedure after triggering the cell reselection, so as to terminate the current system information request procedure and acquire the required SI again in the reselected

DETAILED DESCRIPTION

In the related art, a terminal may perform a cell reselection in an SI request procedure while the terminal still performs the SI request procedure on an original cell, thereby wasting the energy overheads of a base station of the original cell. The present disclosure provides a method and device for requesting system information, a storage medium and a terminal. The present disclosure is further described below in detail with reference to the drawings and embodiments. It is to be understood that the embodiments described herein are merely intended to explain the present disclosure, but is not intended to limit the present disclosure.

Embodiment One

Figure 3:
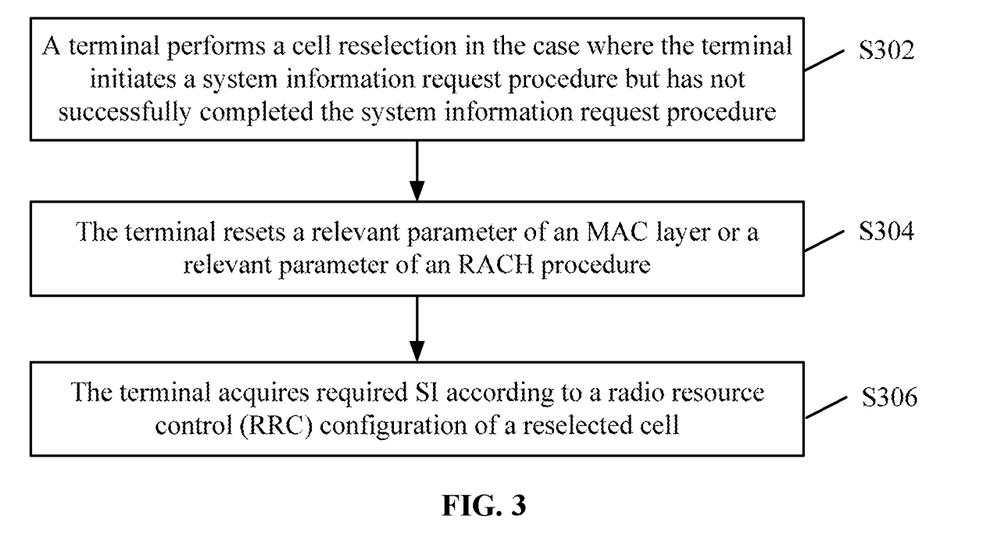
FIG. 3 is a flowchart of a method for requesting system information according to embodiment one of the present disclosure.

Embodiment one of the present disclosure provides a method for requesting system information. The flowchart of the method is as shown in FIG. 3. The method includes steps S302 to S306.

In step 302, a terminal performs a cell reselection in the case where the terminal initiates a system information request procedure but has not successfully completed the system information request procedure.

In step S304, the terminal resets an MAC layer or a relevant parameter of an RACH procedure.

In step S306, the terminal acquires required SI according to an RRC configuration of a reselected cell.

In this embodiment of the present disclosure, when the terminal initiates the system information request procedure, the terminal may immediately reset the MAC layer or the relevant parameter of the RACH procedure after triggering the cell reselection, so as to terminate the current system information request procedure and acquire the required SI again in the reselected cell, thereby avoiding the interference to the current cell and saving the energy overheads of a base station of an original cell.

In the implementation, the procedure in which the terminal performs the cell reselection is as follows: it is detected whether the terminal performs a measurement procedure; in the case where the terminal performs the measurement procedure, it is determined, according to a measurement report, whether a neighboring cell meeting the cell reselection requirement of the terminal exists; and in the case where the neighboring cell meeting the cell reselection requirement of the terminal exists, the terminal switches to the cell meeting the cell reselection requirement of the terminal.

The step of acquiring the required SI according to the RRC configuration of the reselected cell may include the following steps: the terminal determines an SI acquisition mode of the reselected cell through an RRC configuration in a system information block SIB1 and an RRC configuration in a master information block (MIB) of the reselected cell; and the terminal acquires the required SI according to the SI acquisition mode. The SI acquisition mode includes at least one of the modes described below.

(1) The terminal monitors an SI window on a periodic downlink-shared channel (DL-SCH) according to the RRC configuration to acquire corresponding SI. (2) The terminal retriggers the system information request procedure according to the RRC configuration to acquire corresponding SI.

The mode in which the terminal retriggers the system information request procedure according to the RRC configuration to acquire the corresponding SI may be further subdivided into the following steps: the terminal sends a pre-configured preamble having a mapping relationship with an SI type, to request SI corresponding to the preamble; or a random access procedure is initiated through a preamble sent by the terminal, and information of a required SI type is carried in Msg.3, to acquire SI corresponding to the SI type.

Due to different SI acquisition modes, when the required SI is acquired according to the SI acquisition mode, the following different operations in three cases may be performed: (1) in the case where the terminal is to acquire SI and the SI is pre-configured with a preamble identity (ID) having a mapping relationship, the MAC layer of the terminal selects a preamble corresponding to the preamble ID of the SI and indicated in the RRC configuration, and the system information request procedure is initiated, to acquire the SI; (2) in the case where the terminal is to acquire SI but the SI is not pre-configured with a preamble ID, the MAC layer of the terminal selects a preamble from a preamble set for CBRA, and initiates the system information request procedure, to acquire the SI corresponding to the preamble; (3) in the case where the terminal is to acquire SI, the terminal monitors a frequency-domain position and an SI window of the RRC configuration to acquire the SI.

Embodiment Two

Figure 4:
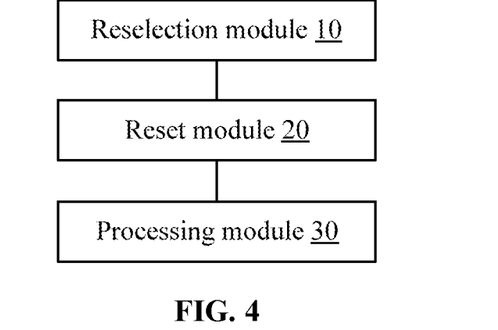
FIG. 4 is a structural diagram of a device for requesting system information according to embodiment two of the present disclosure.

Embodiment two of the present disclosure provides a device for requesting system information. A structural diagram of the device is as shown in FIG. 4. The device includes a reselection module 10, a reset module 20 and a processing module 30.

The reselection module 10 is configured to perform a cell reselection of a terminal in the case where the terminal initiates a system information request procedure but has not successfully completed the system information request procedure. The reset module 20 is coupled to the reselection module 10 and configured to reset an MAC layer or a relevant parameter of an RACH procedure. The processing module 30 is coupled to the reset module 20 and configured to acquire required SI according to an RRC configuration of a reselected cell.

The reselection module is configured to: detect whether the terminal performs a measurement procedure; in the case where the terminal performs the measurement procedure, determine, according to a measurement report, whether a neighboring cell meeting the cell reselection requirement of the terminal exists; and in the case where the neighboring cell meeting the cell reselection requirement of the terminal exists, switch the terminal to the cell meeting the cell reselection requirement of the terminal.

In the implementation, the processing module may include a determination unit and an acquisition unit. The determination unit is configured to determine an SI acquisition mode of the reselected cell through an RRC configuration in a system information block SIB 1 and an RRC configuration in an MIB of the reselected cell. The acquisition unit is coupled to the determination unit and configured to acquire the required SI according to the SI acquisition mode. The SI acquisition mode determined by the determination unit includes at least one of the following modes: (1) the terminal monitors an SI window on a periodic DL-SCH according to the RRC configuration to acquire corresponding SI; or (2) the terminal retriggers the system information request procedure according to the RRC configuration to acquire corresponding SI.

In the specific implementation, the mode in which the terminal retriggering the system information request procedure according to the RRC configuration to acquire the corresponding SI may be performed by the determination unit in one of the two following manners: A: the terminal sends a pre-configured preamble having a mapping relationship with an SI type, to request SI corresponding to the preamble; or B: a random access procedure is initiated through a preamble sent by the terminal, and information of a required SI type is carried in Msg.3, to acquire SI corresponding to the SI type.

Due to different SI acquisition modes determined by the determination unit, when the required SI is acquired according to an SI acquisition mode, the acquisition unit is configured to perform the following three cases.

(1) In the case where the terminal is to acquire SI and the SI is pre-configured with a preamble ID having a mapping relationship, the MAC layer of the terminal is enabled to select a preamble corresponding to the preamble ID of the SI and indicated in the RRC configuration, and the system information request procedure is initiated, to acquire the SI.
(2) In the case where the terminal is to acquire SI but the SI is not pre-configured with a preamble ID, the MAC layer of the terminal is enabled to select a preamble from a preamble set for CBRA, and the system information request procedure is initiated, to acquire the SI corresponding to the preamble.
(3) In the case where the terminal is to acquire SI, the terminal monitors a frequency-domain position and an SI window of the RRC configuration to acquire the SI.

In this embodiment of the present disclosure, when the terminal initiates the system information request procedure, the terminal may immediately reset the MAC layer or the relevant parameter of the RACH procedure after triggering the cell reselection, so as to terminate the current system information request procedure and acquire the required SI again in the reselected cell, thereby avoiding the interference to the current cell and saving the energy overheads of a base station of an original cell.

Embodiment Three

Embodiment three of the present disclosure further provides a storage medium. The storage medium is configured to store a computer program. The computer program, when executed by a processor, implements steps S1 to S3 described below.

In step S1, a terminal performs a cell reselection in the case where the terminal initiates a system information request procedure but has not successfully completed the system information request procedure.

In step S2, an MAC layer or a relevant parameter of an RACH procedure is reset.

In step S3, required SI is acquired according to an RRC configuration of a reselected cell.

In this embodiment of the present disclosure, when the terminal initiates the system information request procedure, the terminal may immediately reset the MAC layer or the relevant parameter of the RACH procedure after triggering the cell reselection, so as to terminate the current system information request procedure and acquire the required SI again in the reselected cell, thereby avoiding the interference to the current cell and saving the energy overheads of a base station of an original cell.

Before the computer program is executed by the processor to implement the step of completing the cell reselection in the SI request procedure, the computer program is further executed by the processor to implement the following steps: it is detected whether the terminal performs a measurement procedure; in the case where the terminal performs the measurement procedure, it is determined, according to a measurement report, whether a neighboring cell meeting the cell reselection requirement of the terminal exists; and in the case where the neighboring cell meeting the cell reselection requirement of the terminal exists, the terminal switches to the neighboring cell.

When the computer program is executed by the processor to implement the step of performing the cell reselection of the terminal, the computer program is executed to implement the following procedure: it is detected whether the terminal performs a measurement procedure; in the case where the terminal performs the measurement procedure, it is determined, according to a measurement report, whether a neighboring cell meeting the cell reselection requirement of the terminal exists; and in the case where the neighboring cell meeting the cell reselection requirement of the terminal exists, the terminal switches to the cell meeting the cell reselection requirement of the terminal.

When the computer program is executed by the processor to implement the step of acquiring the required SI according to the RRC configuration of the reselected cell, the computer program is executed to implement the following steps: an SI acquisition mode of the reselected cell is determined through an RRC configuration in a system information block SIB1 and an RRC configuration in an MIB of the reselected cell; and the required SI is acquired according to the SI acquisition mode. The SI acquisition mode includes at least the following modes: the terminal monitors an SI window on a periodic DL-SCH according to the RRC configuration to acquire corresponding SI, or the terminal retriggers the system information request procedure according to the RRC configuration to acquire corresponding SI. The mode in which the terminal retriggers the system information request procedure according to the RRC configuration to acquire the corresponding SI includes one of the following: the terminal sends a pre-configured preamble having a mapping relationship with an SI type, to request SI corresponding to the preamble; or a random access procedure is initiated through a preamble sent by the terminal, and information of a required SI type is carried in Msg.3, to acquire SI corresponding to the SI type.

Due to different SI acquisition modes, when the computer program is executed by the process to implement the step of acquiring the required SI according to the SI acquisition mode, the computer program is executed to implement one of the cases described below.

(1) In the case where the terminal is to acquire SI and the SI is pre-configured with a preamble ID having a mapping relationship, the MAC layer of the terminal selects a preamble corresponding to the preamble ID of the SI and indicated in the RRC configuration, and the system information request procedure is initiated, to acquire the SI.

(2) In the case where the terminal is to acquire SI but the SI is not pre-configured with a preamble ID, the MAC layer of the terminal selects a preamble from a preamble set for CBRA, and the system information request procedure is initiated, to acquire the SI corresponding to the preamble.

(3) In the case where the terminal is to acquire SI, the terminal monitors a frequency-domain position and an SI window of the RRC configuration to acquire the SI.

In this embodiment, the storage medium may include, but is not limited to, a USB flash disk, a read-only memory (ROM), a random access memory (RAM), a mobile hard disk, a magnetic disk, an optical disk or another medium capable of storing program codes. In this embodiment, the processor performs the steps of the method described in the above embodiments according to the program codes stored in the storage medium. For specific examples in this embodiment, refer to the examples described in the preceding embodiments and optional implementations, which are not repeated in this embodiment. Apparently, it is to be understood by those skilled in the art that the modules or steps of the present disclosure may be implemented by a general computing device and may be concentrated on a single computing device or distributed in a network formed by multiple computing devices. These modules or steps may be implemented by program codes executable by the computing device. Thus, these modules or steps may be stored in a storage device and executed by the computing device. Moreover, in some cases, the illustrated or described steps may be executed in a sequence different from the sequence described herein. Alternatively, each of these modules or steps may be implemented by being made into an integrated circuit module or multiple ones of these modules or steps may be implemented by being made into a single integrated circuit module. In this way, the present disclosure is not limited to any specific combination of hardware and software.

Embodiment Four

In the related NR, the 3GPP determines to introduce a brand-new procedure for requesting system information, so as to save the resource overheads of system information and the power consumption overheads of a base station. However, since a terminal may initiate an SI request procedure in an idle state and an Inactive state, the terminal may still perform a cell reselection when initiating this procedure. This disclosure provides a corresponding scheme for such a scenario to determine the behavior of the terminal caused by the cell reselection in the SI request procedure, so as to avoid the interference of the terminal to a target cell and save the energy overheads of the base station of an original cell.

This embodiment of the present disclosure mainly describes that: a method of resetting MAC is used, so that if the terminal triggers the cell reselection in the SI request procedure, the terminal resets the MAC layer after the cell reselection is completed, so as to terminate the SI request procedure currently in progress, thereby avoiding the interference of the terminal to the target cell and saving the energy overheads of the base station of the original cell. After resetting the MAC layer, the terminal initiates a new SI request procedure according to RRC signaling configured in SIB1 and RRC signaling configured in an MIB and of a current cell.

A description is given below in conjunction with the drawings and two instances.

Figure 5:
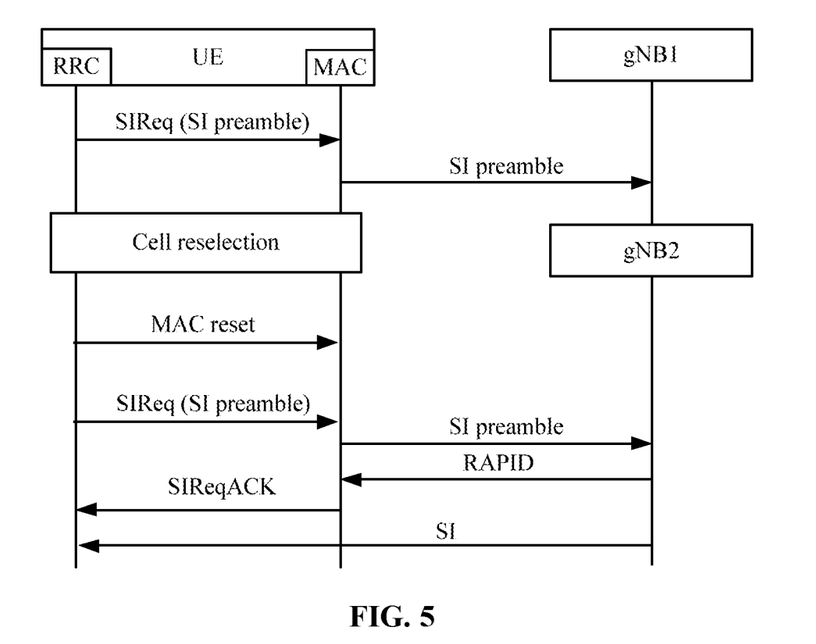
FIG. 5 is a schematic diagram of an Msg.1 based SI request procedure according to instance one in embodiment four of the present disclosure.

Instance One (For a detailed flowchart of this instance, refer to FIG. 5. FIG. 5 illustrates an Msg.1 based SI request procedure.)

In step 1, when a terminal camps in a cell and is currently in an RRC_Inactive state or an RRC_Idle state, the terminal acquires an acquisition mode of other SI through an RRC configuration in SIB1 and an RRC configuration in a system information MIB of a current cell (e.g. 1: an SI window on a periodic DL-SCH is monitored to acquire corresponding system information; 2: a pre-configured preamble is actively sent to request one or more pieces of SI corresponding to the pre-configured preamble (Msg.1 based SI request); 3: a preamble is actively sent, and required one or more pieces of SI are carried on Msg.3 (Msg.3 based SI request)). In the case where the terminal has a requirement for acquiring other one or more pieces of SI and the one or more pieces of SI have been configured with corresponding preamble indexes, an MAC layer is requested by RRC to initiate an Msg.1 based SI request procedure on the current camped cell, and the MAC selects a preamble corresponding to the requested system information according to the RRC configuration and sends the preamble to a gNB.

In step 2, after the terminal sends the preamble to request the system information, when the terminal has not received RAR sent by the base station (gNB) or receives RAR but an RAPID carried by the RAR does not conform to the preamble ID selected by the MAC, if the terminal finds, in a measurement procedure, that a neighboring cell on the same frequency or a different frequency meets the reselection requirement of the current cell, then the terminal immediately performs a cell reselection to switch from the original cell to the reselected target cell.

In step 3, when the terminal completes the cell reselection and camps in the new cell, the terminal no longer monitors a control resource set (CORESET) of the original cell, and the originally requested SI request is no longer required by the terminal; then, the terminal resets the MAC layer (MAC reset) to terminate the Msg.1 based SI request procedure currently in progress, and acquires a request mode of other SI according to an RRC configuration carried in SIB1 and an RRC configuration carried in a system information MIB of the new cell.

In step 4, assuming that the required SI acquisition mode is acquired through the SI request procedure, the UE re-initiates a new SI request procedure on the new camped cell until acquiring the required correct system information on the new cell.

Figure 6:
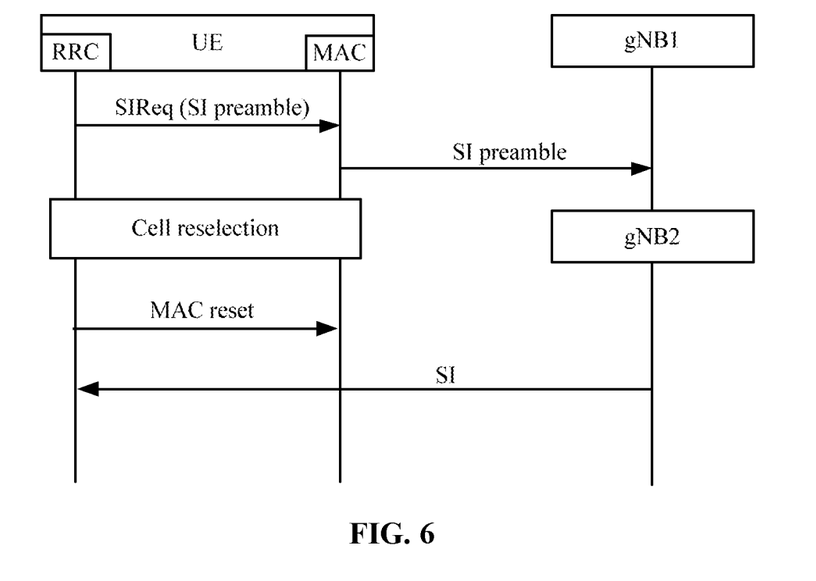
FIG. 6 is a schematic diagram of an Msg.1 based SI request procedure according to instance two in embodiment four of the present disclosure.

Instance Two (For a detailed flowchart of this instance, refer to FIG. 6. FIG. 6 illustrates an Msg.1 based SI request procedure.)

In step 1, when a terminal camps in a cell and is currently in an RRC_Inactive state or in an RRC_Idle state, the terminal acquires an acquisition mode of other SI through an RRC configuration in SIB1 and an RRC configuration in a system information MIB of the current cell (e.g. 1: an SI window on a periodic DL-SCH is monitored to acquire corresponding system information; 2: a pre-configured preamble is actively sent to request one or more pieces of SI corresponding to the pre-configured preamble (Msg.1 based SI request); 3: a preamble is actively sent, and required one or more pieces of SI are carried on Msg.3 (Msg.3 based SI request)). In the case where the terminal has a requirement for acquiring other one or more pieces of SI and the one or more pieces of SI have been configured with corresponding preamble indexes, the MAC layer is requested by RRC to initiate an Msg.1 based SI request procedure on the current camped cell, and the MAC selects a preamble corresponding to the requested system information according to the RRC configuration and sends the preamble to a gNB.

In step 2, after the terminal sends the preamble to request the system information, when the terminal has not received RAR sent by the base station (gNB) or the terminal receives the RAR but an RAPID carried by the RAR does not conform to the preamble ID selected by the MAC, if the terminal finds, in a measurement procedure, that a neighboring cell on the same frequency or a different frequency meets the reselection requirement of the current cell, then the terminal immediately performs a cell reselection to switch from the original cell to the reselected target cell.

In step 3, when the terminal completes the cell reselection and camps in the new cell, the terminal no longer monitors a CORESET of the original cell, and the originally requested SI request is no longer required by the terminal; then, the terminal resets the MAC layer (MAC reset) to terminate the Msg.1 based SI request procedure currently in progress, and acquires an acquisition mode of other SI according to an RRC configuration carried in SIB1 and an RRC configuration carried in a system information MIB of the new cell.

In step 4, assuming that a required SI type may be acquired through system information broadcast, the UE receives the required SI type according to a corresponding frequency-domain position and an SI window of the RRC configuration.

In the preceding instances of the present disclosure, when the terminal performs the SI request procedure and has not completed the SI request procedure, the cell reselection is triggered; after the cell reselection, the UE needs to terminate the SI request procedure current in progress through the step of the MAC reset, thereby avoiding the impact on the current cell and the original cell.

Embodiment Five

In the related NR, the 3GPP determines to introduce a brand-new procedure for requesting system information, so as to save the resource overheads of system information and the power consumption overheads of a base station. However, since a terminal may initiate SI request procedures in an idle state and an Inactive state, the terminal may still performs a cell reselection when initiating this procedure. The present disclosure provides a corresponding scheme for such a scenario to determine the behavior of the terminal caused by the cell reselection in the SI request procedure, so as to avoid the interference of the terminal to a target cell and save the energy overheads of the base station of an original cell.

This embodiment of the present disclosure mainly describes that: a method of resetting MAC is used, so that if the terminal triggers the cell reselection in the SI request procedure, the terminal resets the MAC layer after the cell reselection is completed, so as to terminate the SI request procedure currently in progress, thereby avoiding the interference of the terminal to the target cell and saving the energy overheads of the base station of the original cell. After resetting the MAC layer, the terminal initiates a new SI request procedure according to RRC signaling configured in SIB1 and RRC signaling configured in an MIB of a current cell.

A description is given below in conjunction with the drawings and two instances.

Figure 7:
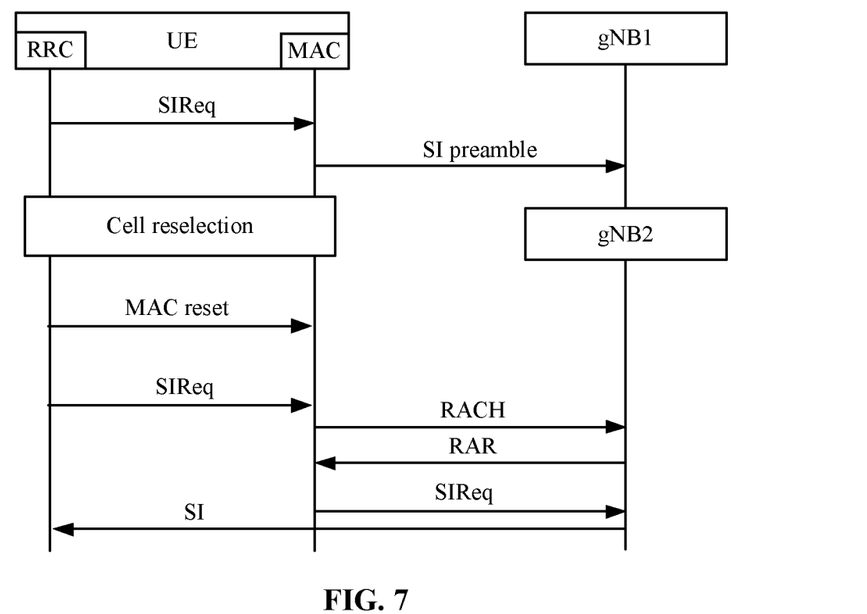
FIG. 7 is a schematic diagram of an Msg.3 based SI request procedure according to instance one in embodiment five of the present disclosure.

Instance One (For a detailed flowchart of this instance, refer to FIG. 7. FIG. 7 illustrates an Msg.3 based SI request procedure.)

In step 1, when a terminal camps in a cell and is currently in an RRC_Inactive state or an RRC_Idle state, the terminal acquires an acquisition mode of other SI through an RRC configuration in SIB1 and an RRC configuration in a system information MIB of a current cell (e.g. 1: an SI window on a periodic DL-SCH is monitored to acquire corresponding system information; 2: a pre-configured preamble is actively sent to request one or more pieces of SI corresponding to the pre-configured preamble (Msg.1 based SI request); 3: a preamble is actively sent and required one or more pieces of SI are carried on Msg.3 (Msg.3 based SI request)). In the case where the terminal has a requirement for acquiring other one or more pieces of SI and the one or more pieces of SI are not configured with corresponding preamble indexes, an MAC layer is requested by RRC to initiate an Msg.3 based SI request procedure on the current camped cell, and MAC selects a preamble from a preamble set for CBRA and sends the preamble to start an Msg.3 based SI request.

In step 2, after the terminal sends the preamble, when the terminal has not received a contention resolution MAC PDU sent by a base station (gNB), or the terminal receives a contention resolution MAC PDU but the MAC PDU cannot be correctly decoded, if the terminal finds, in a measurement procedure, that a neighboring cell on the same frequency or a different frequency meets the reselection requirement of the current cell, then the terminal immediately performs the cell reselection to switch from the original cell to the reselected target cell.

In step 3, when the terminal completes the cell reselection and camps in the new cell, the terminal no longer monitors a CORESET of the original cell, and the originally requested SI request is no longer required by the terminal; then, the terminal resets the MAC layer (MAC reset) to terminate the Msg.3 based SI request procedure currently in progress, and acquires a request mode of other SI according to an RRC configuration carried in SIB1 and an RRC configuration carried in a system information MIB of the new cell.

In step 4, assuming that the required SI acquisition mode is acquired through the SI request procedure, the UE re-initiates a new SI request procedure on the new camped cell until acquiring the required correct system information on the new cell.

Figure 8:
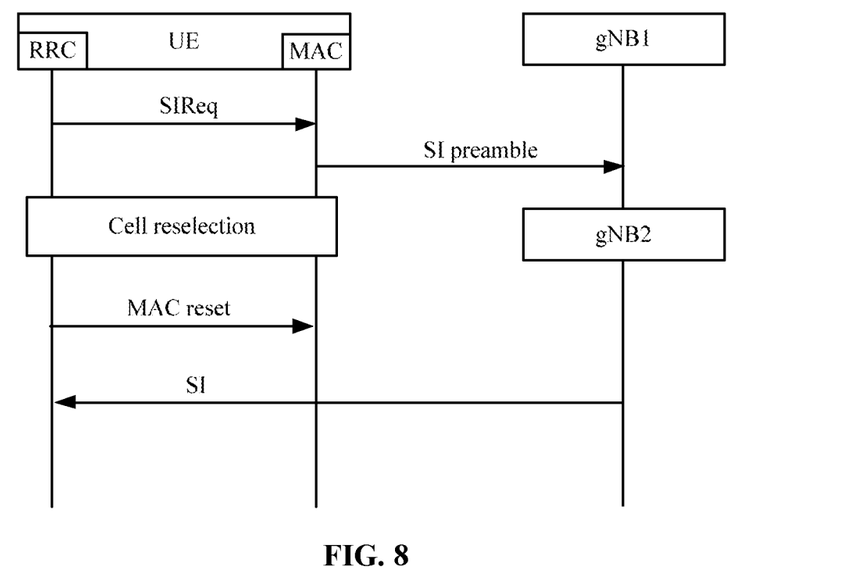
FIG. 8 is a schematic diagram of an Msg.3 based SI request procedure according to instance two in embodiment five of the present disclosure.

Instance Two (For a detailed flowchart of this instance, refer to FIG. 8. FIG. 8 illustrates an Msg.3 based SI request.)

In step 1, when a terminal camps in a cell and is currently in an RRC_Inactive state or an RRC_Idle state, the terminal acquires an acquisition mode of other SI through an RRC configuration in SIB1 and an RRC configuration in a system information MIB of the current cell (e.g. 1: an SI window on a periodic DL-SCH is monitored to acquire corresponding system information; 2: a pre-configured preamble is actively sent to request one or more pieces of SI corresponding to the pre-configured preamble (Msg.1 based SI request); 3: a preamble is actively sent and required one or more pieces of SI are carried on Msg.3 (Msg.3 based SI request)). In the case where the terminal has a requirement for acquiring other one or more pieces of SI and the one or more pieces of SI are not configured with corresponding preamble indexes, an MAC layer is requested by RRC to initiate an Msg.3 based SI request procedure on the current camped cell, and MAC selects a preamble from a preamble set for CBRA and sends the preamble to start an Msg.3 based SI request.

In step 2, after the terminal sends the preamble, when the terminal has not received a contention resolution MAC PDU sent by a base station (gNB), or the terminal receives the contention resolution MAC PDU but the MAC PDU cannot be correctly decoded, if the terminal finds, in a measurement, that a neighboring cell on the same frequency or a different frequency meets the reselection requirement of the current cell, then the terminal immediately performs a cell reselection to switch from the original cell to the reselected target cell.

In step 3, when the terminal completes the cell reselection and camps in the new cell, the terminal no longer monitors a CORESET of the original cell, and the originally requested SI request is no longer required by the terminal; then, the terminal resets the MAC layer (MAC reset) to terminate the Msg.3 based SI request procedure currently in progress, and acquires a request mode of other SI according to an RRC configuration carried in SIB1 and an RRC configuration carried in a system information MIB of the new cell.

In step 4, assuming that the required SI type may be acquired through system periodic broadcast, the UE receives the required SI type according to a corresponding frequency-domain position and an SI window of the RRC configuration.

According to the method of the preceding instances of the present disclosure, when the terminal performs the SI request, the terminal may immediately terminate the current SI request procedure after triggering the cell reselection and acquire the required SI through the RRC configuration in SIB1 and the RRC configuration in the MIB of the current cell, thereby avoiding the interference to the current cell and saving the energy overheads of the base station of the original cell. Moreover, since the current UE is in the IDLE state and the INACTIVE state, resetting MAC has no impact on the UE.

Although the preferred embodiments of the present disclosure have been disclosed for illustrative purposes, those skilled in the art will appreciate that various modifications, additions and substitutions are possible, and accordingly, the scope of the present disclosure should not be limited to the embodiments set forth above.

INDUSTRIAL APPLICABILITY

The present disclosure is applicable to the field of mobile communications. When a terminal initiates a system information request procedure, the terminal may immediately reset an MAC layer or a relevant parameter of an RACH procedure after triggering a cell reselection, so as to terminate the current system information request procedure, and acquire required SI again in a reselected cell, thereby avoiding the interference to the current cell and saving the energy overheads of a base station of an original cell.

What is claimed is:

1. A method for requesting system information (SI), comprising:
    performing, by a terminal, a cell reselection in a case where the terminal initiates an SI request procedure but has not successfully completed the SI request procedure, wherein the terminal performs a measurement procedure while performing the SI request procedure;
    resetting, by the terminal, one of a media access control (MAC) layer or a relevant parameter of a random access channel (RACH) procedure to terminate the SI request procedure; and
    acquiring, by the terminal, required SI according to a radio resource control (RRC) configuration of a reselected cell;
    wherein performing, by the terminal, the cell reselection in the case where the terminal initiates the SI request procedure but has not successfully completed the SI request procedure comprises one of the following:
    in a case where the SI request procedure is a message (Msg.) 1 based SI request procedure, after the terminal sends a preamble and when the terminal has not received a random access response (RAR) or receives the RAR but a random access preamble identity (RAPID) carried by the RAR does not conform to a preamble identity (ID) selected by the MAC layer, and the terminal finds, in the measurement procedure which is performed while the SI request procedure is performed, that a neighboring cell on a frequency that is the same as or different from a frequency of a current cell in which the terminal camps meets a reselection requirement of the terminal, the terminal immediately performs the cell reselection; or
    in a case where the SI request procedure is an Msg.3 based SI request procedure, after the terminal sends a preamble and when the terminal has not received an MAC protocol data unit (PDU) for contention resolution or the terminal receives the MAC PDU for the contention resolution but the MAC PDU is unable to be correctly decoded, and the terminal finds, in the measurement procedure which is performed while the SI request procedure is performed, that a neighboring cell on a frequency that is the same as or different from a frequency of a current cell in which the terminal camps meets a reselection requirement of the terminal, the terminal immediately performs the cell reselection.

2. The method according to claim 1, wherein acquiring the required SI according to the RRC configuration of the reselected cell comprises:
    determining, by the terminal, an SI acquisition mode of the reselected cell through an RRC configuration in a system information block SIB 1 and an RRC configuration in a master information block (MIB) of the reselected cell; and
    acquiring the required SI according to the SI acquisition mode.

3. The method according to claim 2, wherein the SI acquisition mode comprises at least one of the following:
    monitoring, by the terminal, an SI window on a periodic downlink-shared channel (DL-SCH) according to the RRC configuration to acquire corresponding SI; or
    retriggering, by the terminal, the SI request procedure according to the RRC configuration to acquire corresponding SI.

4. The method according to claim 3, wherein retriggering, by the terminal, the SI request procedure according to the RRC configuration to acquire the corresponding SI comprises one of the following:

sending, by the terminal, a pre-configured preamble having a mapping relationship with an SI type, to request SI corresponding to the preamble; or initiating a random access procedure through a preamble sent by the terminal, and carrying information of a required SI type in Msg.3, to acquire SI corresponding to the SI type.

5. The method according to claim 2, wherein acquiring the required SI according to the SI acquisition mode comprises:

in a case where the terminal is to acquire SI and the SI is pre-configured with a preamble identity (ID) having a mapping relationship, selecting, by the MAC layer of the terminal, a preamble corresponding to the preamble ID of the SI and indicated in the RRC configuration of the reselected cell, and initiating the SI request procedure to acquire the SI.

6. The method according to claim 2, wherein acquiring the required SI according to the SI acquisition mode comprises:

in a case where the terminal is to acquire SI but the SI is not pre-configured with a preamble ID, selecting, by the MAC layer of the terminal, a preamble from a preamble set for contention-based random access (CBRA), and initiating the SI request procedure to acquire the SI corresponding to the preamble.

7. The method according to claim 2, wherein acquiring the required SI according to the SI acquisition mode comprises:

in a case where the terminal is to acquire SI, monitoring, by the terminal, a frequency-domain position and an SI window of the RRC configuration to acquire the SI.

8. The method according to claim 1, wherein performing, by the terminal, the cell reselection comprises:

switching, by the terminal, to the neighboring cell meeting the cell reselection requirement of the terminal.

9. A device for requesting system information (SI), comprising:

a reselection module, which is configured to perform a cell reselection of a terminal in a case where the terminal initiates an SI request procedure but has not successfully completed the SI request procedure, wherein the terminal performs a measurement procedure while performing the SI request procedure;

a reset module, which is configured to reset one of a media access control (MAC) layer or a relevant parameter of a random access channel (RACH) procedure to terminate the SI request procedure; and a processing module, which is configured to acquire required SI according to a radio resource control (RRC) configuration of a reselected cell;

wherein the reselection module is configured to perform one of the following:

in a case where the SI request procedure is a message (Msg.) 1 based SI request procedure, after the terminal sends a preamble and when the terminal has not received a random access response (RAR) or receives the RAR but a random access preamble identity (RAPID) carried by the RAR does not conform to a preamble identity (ID) selected by the MAC layer, and the terminal finds, in the measurement procedure which is performed while the SI request procedure is performed, that a neighboring cell on a frequency that is the same as or different from a frequency of a current cell in which the terminal camps meets a reselection requirement of the terminal, immediately performing the cell reselection; or in a case where the SI request procedure is an Msg.3 based SI request procedure, after the terminal sends a preamble and when the terminal the terminal has not received an MAC protocol data unit (PDU) for contention resolution or receives the MAC PDU for the contention resolution but the MAC PDU is unable to be correctly decoded, and the terminal finds, in the measurement procedure which is performed while the SI request procedure is performed, that a neighboring cell on a frequency that is the same as or different from a frequency of a current cell in which the terminal camps meets a reselection requirement of the terminal, immediately performing the cell reselection.

10. The device according to claim 9, wherein the processing module comprises:

a determination unit, which is configured to determine an SI acquisition mode of the reselected cell through an RRC configuration in a system information block SIB1 and an RRC configuration in a master information block (MIB) of the reselected cell; and an acquisition unit, which is configured to acquire the required SI according to the SI acquisition mode.

11. The device according to claim 10, wherein the SI acquisition mode determined by the determination unit comprises at least one of the following:

monitoring, by the terminal, an SI window on a periodic downlink-shared channel (DL-SCH) according to the RRC configuration to acquire corresponding SI; or retriggering, by the terminal, the SI request procedure according to the RRC configuration to acquire corresponding SI.

12. The device according to claim 11, wherein the determination unit acquiring the corresponding SI by retriggering the SI request procedure by the terminal according to the RRC configuration comprises one of the following:

sending, by the terminal, a pre-configured preamble having a mapping relationship with an SI type, to request SI corresponding to the preamble; or initiating a random access procedure through a preamble sent by the terminal, and carrying information of a required SI type in Msg.3, to acquire SI corresponding to the SI type.

13. The device according to claim 10, wherein the acquisition unit is configured to:

in a case where the terminal is to acquire SI and the SI is pre-configured with a preamble identity (ID) having a mapping relationship, enable the MAC layer of the terminal to select a preamble corresponding to the preamble ID of the SI and indicated in the RRC configuration and initiate the SI request procedure to acquire the SI.

14. The device according to claim 10, wherein the acquisition unit is configured to:

in a case where the terminal is to acquire SI but the SI is not pre-configured with a preamble ID, enable the MAC layer of the terminal to select a preamble from a preamble set for contention-based random access (CBRA) and initiate the SI request procedure to acquire SI corresponding to the preamble.

15. The device according to claim 10, wherein the acquisition unit is configured to:

in a case where the terminal is to acquire SI, monitor a frequency-domain position and an SI window of the RRC configuration to acquire the SI.

16. The device according to claim 9, wherein the reselection unit is configured to:
switch the terminal to the neighboring cell meeting the cell reselection requirement of the terminal.

17. A non-transitory storage medium, storing a computer program, wherein the computer program is configured to, when executed by a processor, implement steps of the method for requesting system information according to claim 1.

18. A terminal, comprising at least a memory and a processor, wherein the memory stores a computer program, and the processor is configured to, when executing the compute program in the memory, implement steps of the method for requesting system information according to claim 1.

* * * * *